US010724869B2

(12) United States Patent
Wang et al.

(10) Patent No.: US 10,724,869 B2
(45) Date of Patent: Jul. 28, 2020

(54) TECHNOLOGIES FOR PROVIDING INFORMATION TO A USER WHILE TRAVELING

(71) Applicant: Intel Corporation, Santa Clara, CA (US)

(72) Inventors: Ren Wang, Portland, OR (US); Zhonghong Ou, Hillsboro, OR (US); Arvind Kumar, Beaverton, OR (US); Kristoffer Fleming, Chandler, OR (US); Tsung-Yuan C. Tai, Portland, OR (US); Timothy J. Gresham, Portland, OR (US); John C. Weast, Portland, OR (US); Corey Kukis, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/166,928

(22) Filed: Oct. 22, 2018

(65) Prior Publication Data
US 2019/0056232 A1   Feb. 21, 2019

Related U.S. Application Data

(62) Division of application No. 14/368,350, filed as application No. PCT/US2013/076657 on Dec. 19, 2013, now Pat. No. 10,145,694.

(51) Int. Cl.
G01C 21/34        (2006.01)
H04W 4/024       (2018.01)
(Continued)

(52) U.S. Cl.
CPC ..... *G01C 21/3453* (2013.01); *G01C 21/3446* (2013.01); *H04B 17/318* (2015.01);
(Continued)

(58) Field of Classification Search
CPC ........... G01C 21/3453; G01C 21/3446; H04B 17/318; H04W 4/024; H04W 4/029; H04W 24/08
(Continued)

(56) References Cited

U.S. PATENT DOCUMENTS

2014/0162693 A1* 6/2014 Wachter ................ H04W 4/021
                                                                   455/456.3
2014/0274135 A1* 9/2014 Edge ...................... H04W 4/021
                                                                   455/456.2

OTHER PUBLICATIONS

European Office action in European patent application No. 13899393. 6, dated Jul. 6, 2018 (11 pages).
(Continued)

*Primary Examiner* — Marthe Y Marc-Coleman
(74) *Attorney, Agent, or Firm* — Barnes & Thornburg LLP

(57) ABSTRACT

Technologies for providing information to a user while traveling include a mobile computing device to determine network condition information associated with a route segment. The route segment may be one of a number of route segments defining at least one route from a starting location to a destination. The mobile computing device may determine a route from the starting location to the destination based on the network condition information. The mobile computing device may upload the network condition information to a crowdsourcing server. A mobile computing device may predict a future location of the device based on device context, determine a safety level for the predicted location, and notify the user if the safety level is below a threshold safety level. The device context may include location, time of day, and other data. The safety level may be determined based on predefined crime data.

25 Claims, 5 Drawing Sheets

(51) Int. Cl.
    *H04W 4/029*     (2018.01)
    *H04B 17/318*    (2015.01)
    *H04W 24/08*     (2009.01)
    *H04W 4/02*      (2018.01)
    *H04W 88/02*     (2009.01)
(52) U.S. Cl.
    CPC .......... *H04W 4/024* (2018.02); *H04W 4/029* (2018.02); *H04W 24/08* (2013.01)
(58) Field of Classification Search
    USPC ........................................................ 701/522
    See application file for complete search history.

(56) References Cited

OTHER PUBLICATIONS

European Office action in European patent application No. 13899393.6, dated Feb. 11, 2019 (5 pages).
Chinese Office action in Chinese patent application No. 201380081040.7, dated Mar. 26, 2019, including machine translation (10 pages).
Chinese Office action in Chinese patent application No. 201380081040.7, dated Oct. 8, 2019, including machine translation (13 pages).

\* cited by examiner

TECHNOLOGIES FOR PROVIDING INFORMATION TO A USER WHILE TRAVELING

CROSS-REFERENCE TO RELATED APPLICATIONS

The present application is a divisional of U.S. application Ser. No. 14/368,350, entitled "TECHNOLOGIES FOR PROVIDING INFORMATION TO A USER WHILE TRAVELING," which was filed on Jun. 24, 2014, and which is a national stage entry under 35 USC § 371(b) of International Application No. PCT/US2013/076657, which was filed Dec. 19, 2013.

BACKGROUND

Mobile computing devices such as smartphones, tablets, and in-vehicle infotainment devices typically include applications for navigation, driving directions, or pathfinding. Those applications may use the global positioning system (GPS) or other techniques to determine the device location. Driving directions and other routes may be determined by the mobile device or by a server device in communication with the mobile device. Directions are typically generated for the route having the shortest distance or travel time between two points.

Such mobile devices often offer other applications in addition to navigation applications. For example, many mobile devices provide entertainment applications including streaming audio or video as well as productivity applications including remote access to documents and other computer files. As a result, users typically desire reliable and fast network data connections for their mobile devices. Typical mobile devices display current network conditions to the user in the form of a simple "bar" graph indicating signal strength.

Geographical information systems (GIS) may store many types of data indexed and/or searchable by geographical location. For example, a GIS may store crime data for various municipalities, localities, and/or other geographical locations. A typical GIS includes a GIS server maintained by a municipality or other entity that may be accessed by numerous client devices such as mobile computing devices. Typically, GIS data is available for manual searching and/or browsing, for example through a web interface.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
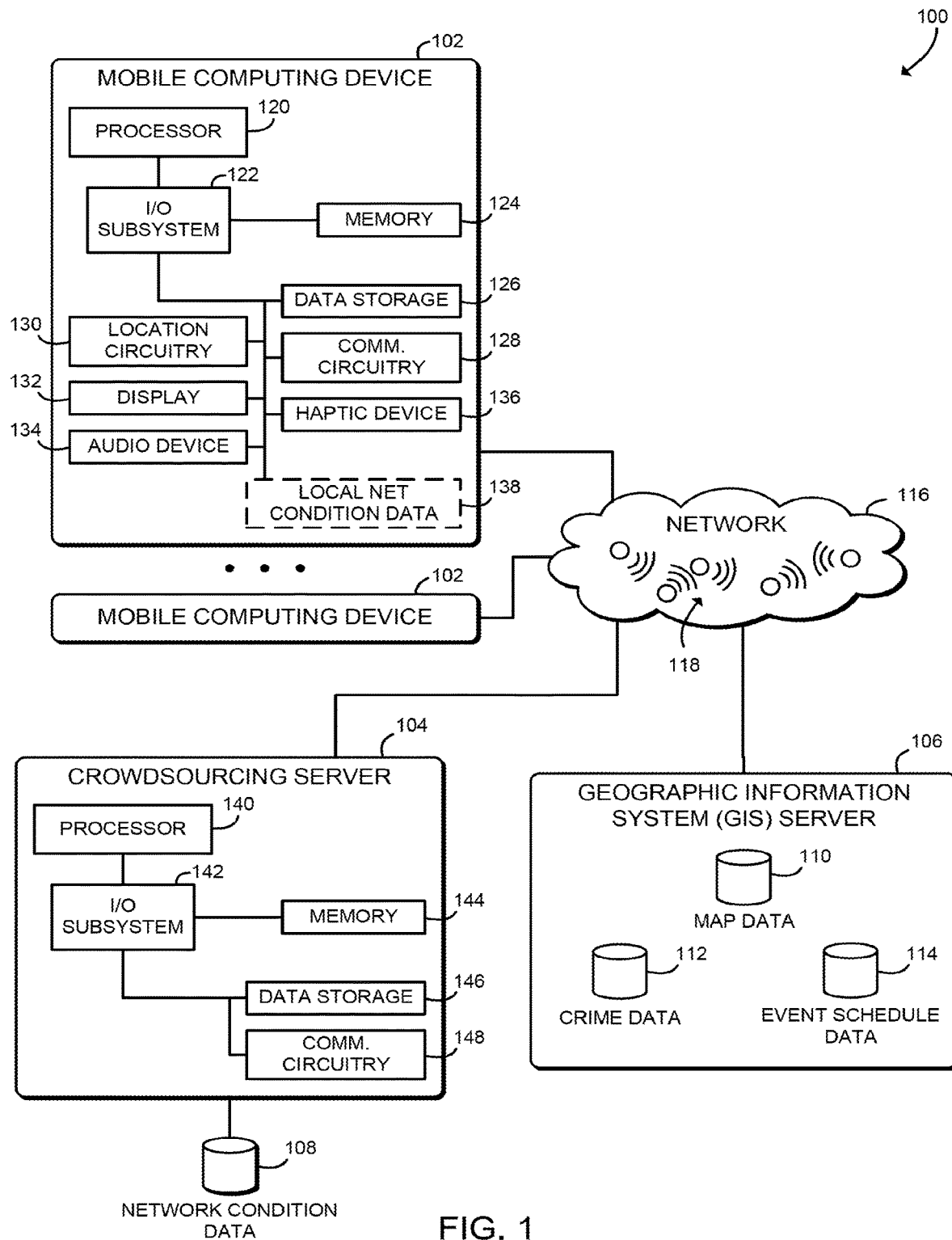
FIG. 1 is a simplified block diagram of at least one embodiment of a system for providing information to a user while traveling.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for providing information to a user while traveling includes one or more mobile computing devices 102, a crowdsourcing server 104, and a geographical information system (GIS) server 106, which all may be in communication with each other over a network 116. In use, as discussed in more detail below, each mobile computing device 102 may determine network condition data 108 associated with a number of geographic locations. Each mobile computing device 102 and/or the crowdsourcing server 104 may use the network condition data 108 in combination with map data 110 to determine a route between two geographic locations as a function of the network condition data 108. Thus, the system 100 may provide directions between locations along a route having optimal, or otherwise improved, network connectivity. Improved network connectivity along the route may increase data usage or otherwise improve the travel experience for the user of the mobile computing device 102.

Additionally or alternatively, in use, as discussed in more detail below, a mobile computing device 102 may determine the current context of the mobile computing device 102 and determine a safety level associated with the current context. The safety level may be determined based on crime data 112 and/or event schedule data 114 received from the GIS server 106. The computing device 102 may proactively alert the user of the safety level, for example by signaling an alert when the safety level falls below a threshold level. The system 100 thus may improve safety and thereby encourage users to explore new locations.

Each mobile computing device 102 may be embodied as any type of mobile computing device capable of performing the functions described herein including, without limitation, a smartphone, a cellular telephone, a handset, a wearable computing device, an in-vehicle infotainment device, a computer, a tablet computer, a laptop computer, a notebook computer, a messaging device, a network appliance, a web appliance, a distributed computing system, a multiprocessor system, a processor-based system, and/or a consumer electronic device. As shown in FIG. 1, an illustrative mobile computing device 102 includes a processor 120, an input/output subsystem 122, a memory 124, a data storage device 126, communication circuitry 128, and location circuitry 130. Of course, each mobile computing device 102 may include other or additional components, such as those commonly found in a desktop computer (e.g., various input/output devices) in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the mobile computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the mobile computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the mobile computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may permanently or temporarily store the network condition data 108 and/or the map data 110. In some embodiments, the data storage device 126 may permanently or temporarily store the crime data 112 and/or the event schedule data 114.

The communication circuitry 128 of the mobile computing device 102 may be embodied as any communication circuit, device, or collection thereof, capable of enabling communications between the mobile computing device 102, the crowdsourcing server 104, the GIS server 106, and/or other remote devices over the network 116. The communication circuitry 128 may be configured to use any one or more communication technology (e.g., wireless or wired communications) and associated protocols (e.g., 3G, LTE, Bluetooth®, Wi-Fi®, WiMAX, etc.) to effect such communication.

The location circuitry 130 of the mobile computing device 102 may be embodied as any type of circuit capable of determining the precise or approximate position of the mobile computing device 102. For example, the location circuitry 130 may be embodied as a global positioning system (GPS) receiver, capable of determining the precise coordinates of the mobile computing device 102. In other embodiments, the location circuitry 130 may triangulate or trilaterate the position of the mobile computing device 102 using distances or angles to cellular network towers with known positions, provided by the communication circuitry 128. In other embodiments, the location circuitry 130 may determine the approximate position of the mobile computing device 102 based on association to wireless networks with known positions, using the communication circuitry 128.

In the illustrative embodiment, the mobile computing device 102 further includes a display 132, an audio device 134, and a haptic device 136. The display 132 of the mobile computing device 102 may be embodied as any type of display capable of displaying digital information such as a liquid crystal display (LCD), a light emitting diode (LED), a plasma display, a cathode ray tube (CRT), or other type of display device. In some embodiments, the display 132 may be coupled to a touch screen to allow user interaction with the mobile computing device 102. The audio device 134 may be embodied as any device capable of generating audio signals for output, such as a speaker, an audio transducer, an audio output jack, a digital-to-analog converter (DAC), or other type of audio device. The haptic device 136 may be embodied as any device capable of providing tactile feedback to the user of the mobile computing device 102, such as a vibrator, buzzer, force feedback device, or any other tactile feedback device. The haptic device 136 may be used by the mobile computing device 102 to provide notifications to the user that are not visible, audible, or otherwise easily detectable by other nearby persons.

In some embodiments, the illustrative mobile computing device 102 may include local network condition data 138. The local network condition data 138 may include some or all of the network condition data 108 that is generated by the mobile computing device 102, cached from the crowdsourcing server 104, or otherwise temporarily or permanently stored on the mobile computing device 102. The local network condition data 138 may be embodied as any type of data storage device, and in some embodiments may be stored in part of the data storage device 126 and/or the memory 124.

The crowdsourcing server 104 is configured to manage network condition data 108 received from any number of mobile computing devices 102. The crowdsourcing server 104 may be embodied as any type of server computing device, or collection of devices, capable of performing the functions described herein. As such, the crowdsourcing server 104 may be embodied as a single server computing device or a collection of servers and associated devices. For example, in some embodiments, the crowdsourcing server 104 may be embodied as a "virtual server" formed from multiple computing devices distributed across the network 116 and operating in a public or private cloud. Accordingly, although the crowdsourcing server 104 is illustrated in FIG. 1 and described below as embodied as a single server computing device, it should be appreciated that the crowdsourcing server 104 may be embodied as multiple devices cooperating together to facilitate the functionality described below. Illustratively, the crowdsourcing server 104 includes a processor 140, an I/O subsystem 142, a memory 144, a data storage device 146, communication circuitry 148, and/or other components and devices commonly found in a server or similar computing device. Those individual components of the crowdsourcing server 104 may be similar to the corresponding components of the mobile computing device 102, the description of which is applicable to the corresponding components of the crowdsourcing server 104 and is not repeated herein so as not to obscure the present disclosure.

The geographical information system (GIS) server 106 is configured to store and manage information related to geographical location. For example, each item of such information may be encoded, indexed, plotted, or otherwise associated with a particular geographical location. Such geographical information may include, without limitation, the map data 110, the crime data 112, and the event schedule data 114. The GIS server 106 may be embodied as any type of server computing device, or collection of devices, capable of performing the functions described herein. As such— similar to the crowdsourcing server 104—the GIS server 106 may be embodied as a "virtual server" formed from multiple computing devices distributed across the network 116 and operating in a public or private cloud. As such, the GIS server 106 may include a processor, I/O subsystem, memory, data storage, communication circuitry, and/or other components and devices commonly found in a server or similar computing device. Those individual components of the GIS server 106 may be similar to the corresponding components of the mobile computing device 102 and/or the crowdsourcing server 104 and are not illustrated so as not to obscure the present disclosure. In some embodiments (not shown) the crowdsourcing server 104 and the GIS server 106 may both be embodied by the same physical server device or collection of devices.

The network condition data 108, the map data 110, the crime data 112, and the event schedule data 114 may be embodied as any network-accessible data storage, including without limitation as a database, a file server, network attached storage, or storage area network. The network condition data 108 may be accessible to and/or maintained by either or both of the mobile computing devices 102 and the crowdsourcing server 104. Accordingly, part or all of the network condition data 108 may be stored in the local network condition data 138 of each mobile computing device 102 and/or in the data storage device 146 of the crowdsourcing server 104. The map data 110, crime data 112, and event schedule data 114 may be accessible to and/or maintained by the GIS server 106. Each mobile computing device 102 and/or the crowdsourcing server 104 may access such geographical data via the GIS server 106.

As discussed in more detail below, the mobile computing device 102, the crowdsourcing server 104, and the GIS server 106 may be configured to transmit and receive data with each other and/or other remote devices over the network 116. The network 116 includes a number of network nodes 118 which may be embodied as, for example, wireless cell towers. Each of the network nodes 118 may have an associated geographical coverage area and signal strength. Thus, communications from a mobile computing device 102 over the network 116 may connect to different network nodes 118, depending on the current geographical location or other current context of the mobile computing device 102. The network 116 and/or the network nodes 118 may be embodied as any number of various wired and/or wireless networks. For example, the network 116 may be embodied as, or otherwise include, a wired or wireless local area network (LAN), a wired or wireless wide area network (WAN), a cellular network, and/or a publicly-accessible, global network such as the Internet. As such, the network 116 may include any number of additional devices, such as additional computers, routers, and switches, to facilitate communications among the devices of the system 100.

Figure 2:
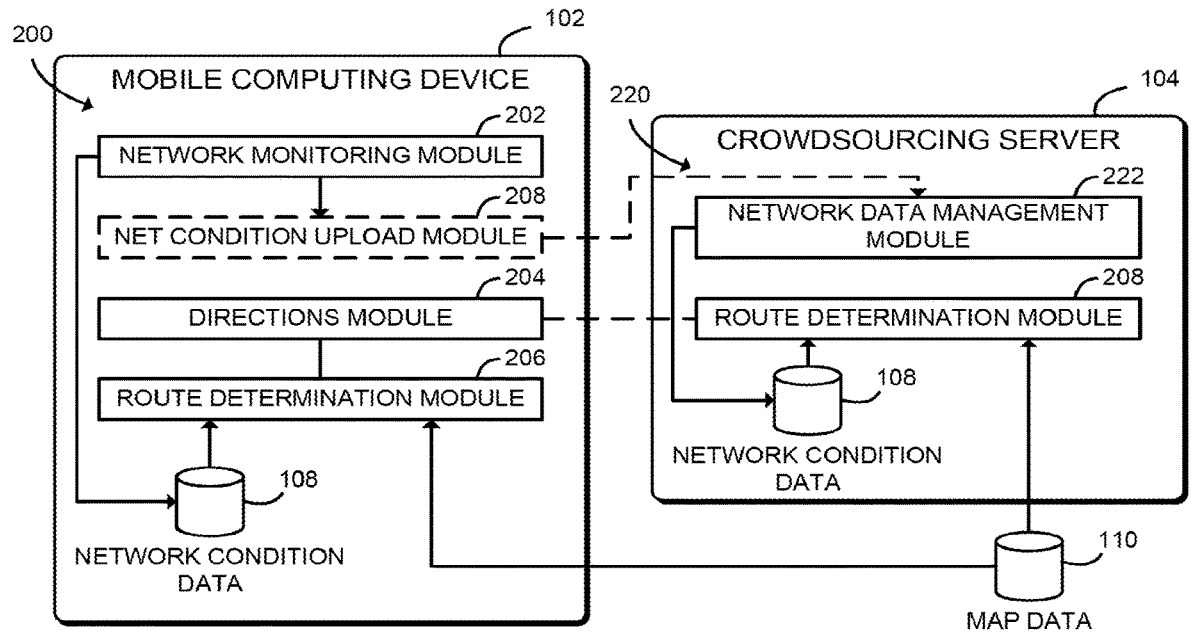
FIG. 2 is a simplified block diagram of at least one embodiment of various environments that may be established by the system of FIG. 1.

Referring now to FIG. 2, in the illustrative embodiment, a mobile computing device 102 establishes an environment 200 during operation. The illustrative environment 200 includes a network monitoring module 202, a directions module 204, a route determination module 206, and in some embodiments a network condition upload module 208. The various modules of the environment 200 may be embodied as hardware, firmware, software, or a combination thereof.

The network monitoring module 202 is configured to monitor and record network condition data 108. As described further below, the network condition data 108 may describe network type, signal strength, or any other aspect related to network connectivity at a particular location. In some embodiments, the network monitoring module 202 may store the network condition data 108 locally on the mobile computing device 102. Additionally or alternatively, in some embodiments the network monitoring module 202 may forward the network condition data 108 to the network condition upload module 208.

The network condition upload module 208 is configured to transmit network condition data 108 to the crowdsourcing server 104. The network condition data 108 may be transmitted in any format usable by the crowdsourcing server 104. As described further below, the crowdsourcing server 104 may use network condition data 108 collected by a number of mobile computing devices 102 to determine routes.

The directions module 204 is configured to receive a request from a user of the mobile computing device 102 for directions from a starting location to a destination location, and to present the resulting route to the user. For example, the directions module 204 may be embodied as or otherwise include a mapping application to receive user input and display results. In some embodiments, the directions module 204 may transmit a request for directions, including the starting location and the destination location, to the crowdsourcing server 104.

The route determination module 206 is configured to determine an optimal route from the starting location to the destination location, based on the network condition data 108 and the map data 110. As further described below, the route may include a number of route segments connecting a number of geographical locations along the route from the starting location to the destination location. Each route segment may correspond to a physical connection or part of a physical connection such as a road, bridge, or highway. The optimal route may be embodied as the shortest path from the starting location to the destination location that also has acceptable network conditions. As further described below, the route determination module 206 may determine the optimal route by adjusting road cost information based on the network condition data 108 and then applying a graph search algorithm to the find the shortest path. The route determination module 206 may access the map data 110 via the GIS server 106 or may access map data stored locally on the mobile computing device 102 (not shown).

Still referring to FIG. 2, in some embodiments the crowdsourcing server 104 may establish an environment 220 during operation. The illustrative environment 220 includes a network data management module 222 and the route determination module 206. The various modules of the environment 200 may be embodied as hardware, firmware, software, or a combination thereof.

The network data management module 222 is configured to receive and store network condition data 108 from one or more mobile computing devices 102. The network condition data 108 may be stored in network storage accessible to the crowdsourcing server 104 or stored locally by the crowdsourcing server 104.

The route determination module 206 of the environment 220 is configured similarly to the route determination module 206 of the environment 200. In particular, the route determination module 206 is configured to determine an optimal route from the starting location to the destination location, based on the network condition data 108 and the map data 110. The starting location and the destination location may be included in a request for a route received from one of the mobile computing devices 102. Thus, the route determination module 206 may determine the optimal route based on the map data 110 and on network condition data 108 originating from more than one mobile computing device 102. In particular, the network condition data 108 may have been generated by a mobile computing device 102 different from the mobile computing device 102 that is currently requesting directions.

Figure 3:
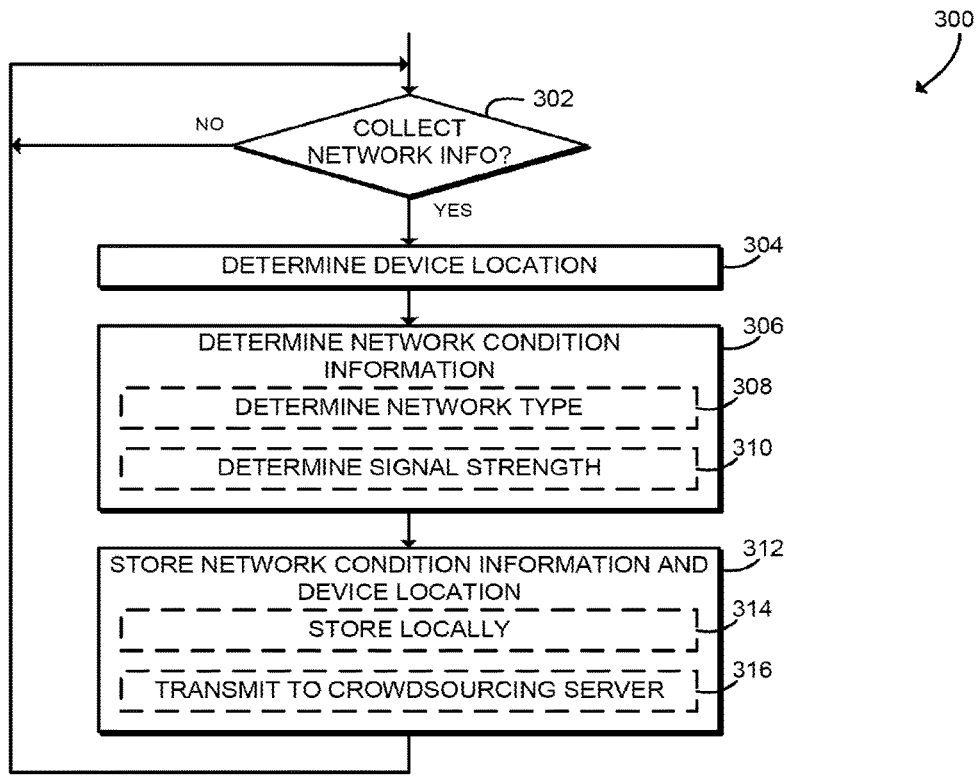
FIG. 3 is a simplified flow diagram of at least one embodiment of a method for collecting network condition information that may be executed by a mobile computing device of the system of FIGS. 1 and 2.

Referring now to FIG. 3, in use, a mobile computing device 102 may execute a method 300 for collecting network condition data 108. The method 300 begins with block 302, in which the mobile computing device 102 determines whether to collect network condition data 108. For example, the mobile computing device 102 may collect network condition data 108 in response to a user command. As another example, the mobile computing device 102 may collect network condition data 108 automatically and/or in the background based on a configuration setting. If not collecting network condition data 108, the method 300 loops back to block 302 and continues determining whether to collect network condition data 108. If collecting network condition data 108, the method 300 advances to block 304.

In block 304, the mobile computing device 102 determines the location of the mobile computing device 102. The mobile computing device 102 may determine location based on data received from the location circuitry 130. The mobile computing device 102 may determine an absolute location, for example GPS coordinates, or determine a location associated with one or more route segments such as roads or other pathways.

In block 306, the mobile computing device 102 determines network condition information associated with the current location. The network condition information includes any information describing, based on, or otherwise relating to network connection quality and availability at the current location. The mobile computing device 102 may determine the network condition information by analyzing information received by the communication circuitry 128. Additionally or alternatively, in some embodiments the mobile computing device 102 may determine the network condition information by averaging data received for several locations along a route segment such as a road or highway to generate averaged condition data for that segment. In some embodiments, in block 308 the mobile computing device 102 may determine a network type available at the current location. The network type may include wireless network technology and/or protocol (e.g., CDMA, GSM, LTE, Wi-Fi), network speed (e.g., 3G, 4G), frequency band, or any other network classification. In some embodiments, in block 310 the mobile computing device 102 may determine the signal strength at the current location. The mobile computing device 102 may determine the signal strength using information received by the communication circuitry 128.

In block 312, the mobile computing device 102 stores the network condition information and the associated device location (e.g., in association with each other) in the network condition data 108. In some embodiments, in block 314 the mobile computing device 102 may store the network condition data 108 locally, for example in the data storage device 126 of the mobile computing device 102. Additionally or alternatively, in some embodiments in block 316 the mobile computing device 102 may transmit the network condition data 108 to the crowdsourcing server 104 for storage. As described further below, the crowdsourcing server 104 may use network condition data 108 received from numerous mobile computing devices 102 to map routes between locations. Collecting network condition data from numerous mobile computing devices 102 allows the crowdsourcing server 104, for example, to determine a route based on the network condition information for a user who has never ventured along the determined route. After storing the network condition data 108, the method 300 loops back to block 302 to continue collecting network condition data 108.

Figure 4:
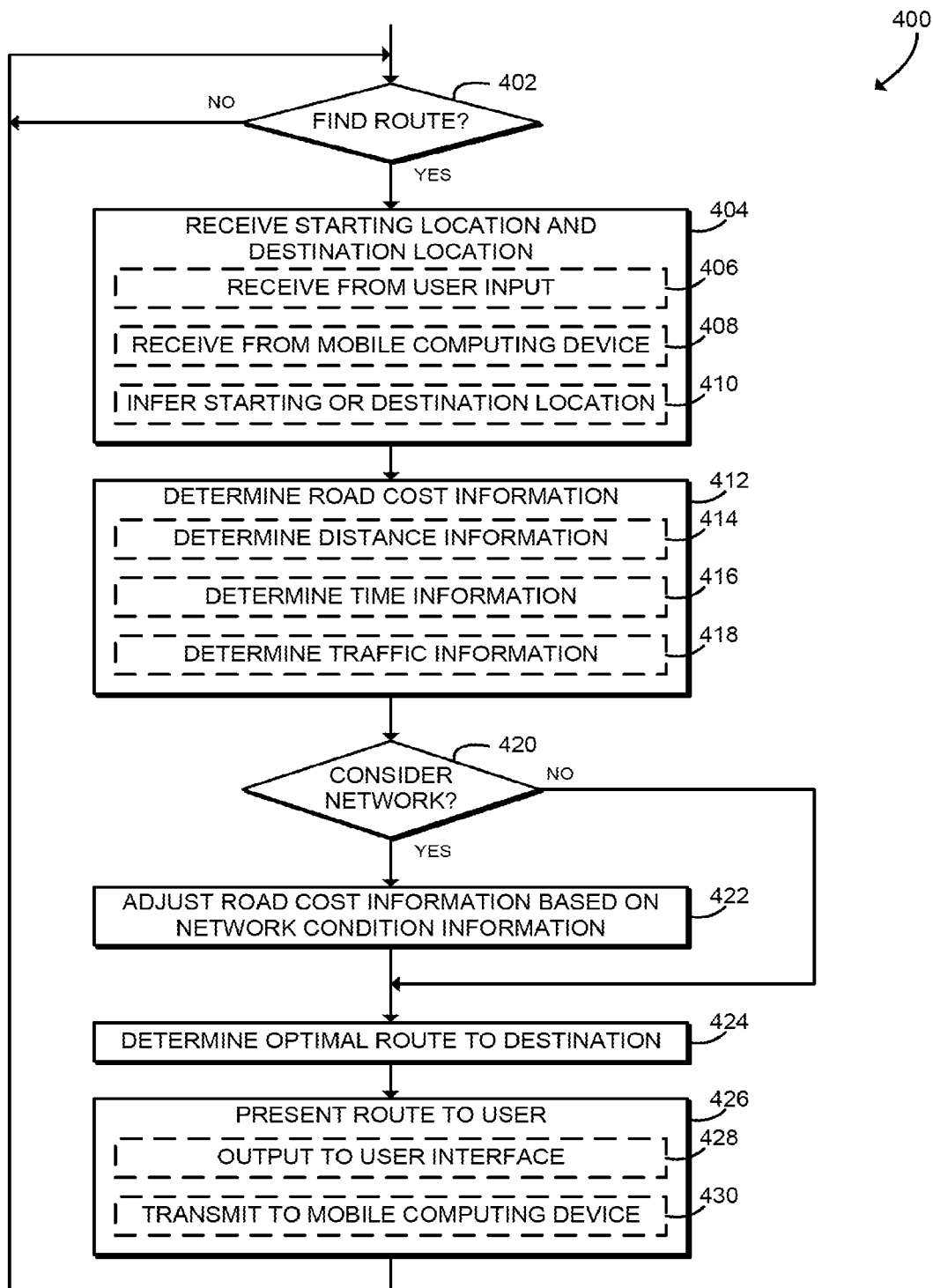
FIG. 4 is a simplified flow diagram of at least one embodiment of a method for determining a route based on network condition information that may be executed by a mobile computing device and/or a crowdsourcing server of the system of FIGS. 1 and 2.

Referring now to FIG. 4, in use the mobile computing device 102 and/or the crowdsourcing server 104 may execute a method 400 for determining a route based on the network condition data 108. As described below, the method 400 may be executed locally on a mobile computing device 102 or remotely on the crowdsourcing server 104 in response to a request from a mobile computing device 102. Additionally or alternatively, it should be understood that parts of the method 400 may be executed by a mobile computing device 102 and/or the crowdsourcing server 104 in any combination. The method 400 begins in block 402, in which the mobile computing device 102 and/or the crowdsourcing server 104 determines whether to find a new route. Finding a new route may be initiated in response to a command from a user of the mobile computing device 102, for example initiation an application on the mobile computing device 102 or initiation of a network request to the crowdsourcing server 104. If no new route is to be determined, the method 400 loops back to block 402 to continue waiting for a command to find a new route. If a new route is to be determined, the method 400 advances to block 404.

In block 404, the mobile computing device 102 and/or the crowdsourcing server 104 receives, or otherwise determines, a starting location and a destination location for the requested route. The starting location and destination location may be specified in any appropriate format such as, for example, street address, geographical coordinate, point of interest, place name, or other location identifier. In some embodiments, in block 406 the mobile computing device 102 may receive the starting location and/or destination location from user input, for example from touch screen input into a navigation application. Additionally or alternatively, in some embodiments in block 408 the crowdsourcing server 104 may receive the starting location and destination location from the mobile computing device 102 as part of a request received over the network 116. In some embodiments in block 410 the mobile computing device 102 and/or the crowdsourcing server 104 may infer the starting location or the destination location. For example, the starting location may be inferred to be the current location of the mobile computing device 102 as determined using the location circuitry 130.

Figure 5:
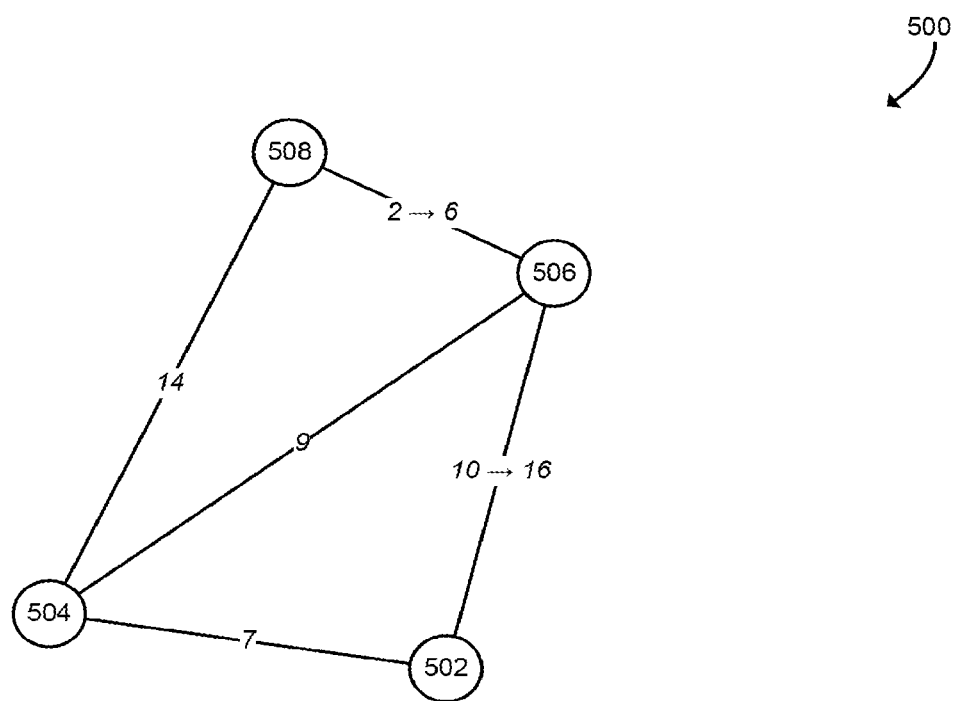
FIG. 5 is a diagram illustrating a graph structure that may be used to determine the route in the method of FIG. 4.

In block 412, the mobile computing device 102 and/or the crowdsourcing server 104 determines road cost information. The road cost information may be embodied as any measure of the relative cost of traveling between two geographic locations. The road cost information may be loaded from the map data 110, which may be stored locally on or accessible over the network 116. In some embodiments, the road cost information may be embodied as a graph data structure, with nodes representing geographic locations and edges representing the road cost associated with the route segment between the geographic locations. For example, referring to FIG. 5, diagram 500 illustrates such a graph structure. Nodes 502 through 508 represent geographic locations, and the edges between the nodes represent route segments connecting the nodes. The edges are labeled with road cost information, illustrated as dimensionless integers. Referring back to FIG. 4, in some embodiments, in block 414 the mobile computing device 102 and/or the crowdsourcing server 104 may determine the road cost based on distance information between locations. In some embodiments, in block 416 the mobile computing device 102 and/or the crowdsourcing server 104 may determine the road cost based on travel time between locations. Additionally or alternatively, in some embodiments, in block 418 the mobile computing device 102 and/or the crowdsourcing server 104 may determine the road cost based on traffic information. Of course, in other embodiments the road cost information may be based any other data or combination of data that may be relevant to geographical routing along the route segment between two points. For example, in some embodiments, the road cost data may be an aggregation of distance, time, and/or traffic information and may be adjusted, or otherwise dependent, on the user's desires or goals (e.g., shortest route, quickest route, etc.).

In block 420, the mobile computing device 102 and/or the crowdsourcing server 104 determines whether to consider network condition when generating the route. Network condition may be considered, for example, based on a user request or a device preference. In some embodiments, network condition may be considered if sufficient network condition data 108 exists for the relevant route. If network condition is not to be considered, the method 400 skips ahead to block 424, described below. If network condition is considered, the method 400 advances to block 422.

In block 422, the mobile computing device 102 and/or the crowdsourcing server 104 adjusts the road cost information based on the network condition data 108. The road cost information may be adjusted in any manner that causes the routing process to consider network condition. For example, in some embodiments, road cost may be increased for route segments between geographic locations having poor network conditions (e.g., inferior network type, weak signal strength, spotty coverage, etc.). As described above, the road cost information may be adjusted based on network condition data 108 generated by any mobile computing device 102; in other words, the crowdsourcing server 104 may use network condition data 108 originating from several mobile computing devices 102 to adjust the road cost information. Further, although illustrated as occurring during execution of the method 400, the road cost information may be adjusted at any time. For example, the road cost information may be adjusted and cached for later use when generated by the mobile computing device 102 and/or received by the crowdsourcing server 104. Referring again to FIG. 5, consider that road cost information is embodied as the edges of the graph data structure shown in diagram 500. In that example, the value of road cost for edges corresponding to route segments with poor network conditions may be increased. For example, the road cost value for the edge between nodes 502, 506 may be increased from 10 to 16 based on poor network conditions. Conversely, the road cost value for the edge between nodes 502, 504 may remain unchanged based on acceptable network conditions. The specific amount of increase or adjustment to the road cost may be based on, for example, the degree of low quality network conditions, as a percentage or function of the base road cost, or other criteria. Additionally, in some embodiments, the road cost for a particular segment may be decreased based on high quality network conditions.

Referring back to FIG. 4, in block 424, the mobile computing device 102 and/or the crowdsourcing server 104 determines an optimal route from the starting location to the destination location based on the road cost information. Thus, when the process considers network conditions, the optimal route may be determined based on road cost information that has been adjusted to reflect network conditions. Any suitable algorithm for finding the optimal route may be used. For example, in some embodiments a shortest-path graph search algorithm may be used, such as Dijkstra's algorithm. Additionally or alternatively, in some embodiments the mobile computing device 102 and/or the crowdsourcing server 104 may generate an optimal route without considering network conditions (e.g., considering distance, travel time, traffic congestion, etc.), and that route may be adjusted based on network conditions (e.g., by rerouting to avoid route segments having poor network conditions).

Referring again to FIG. 5, consider an illustrative application of Dijkstra's algorithm to find an optimal route between nodes 502 and 508. As background, to perform Dijkstra's algorithm, all of the nodes are initially marked as unvisited and a current node is initially selected. For the current node, the tentative distance to all neighboring nodes is calculated based on the road cost value of each corresponding edge. For each neighboring node, the tentative distance is recorded if less than the previously calculated tentative distance. After calculating tentative distances for all neighbor nodes, the current node is marked as visited. The unvisited node having the lowest tentative distance is selected as the next current node, and the algorithm is repeated until the current node is the destination node. After completion, the optimal route may be found by backtracking through the graph from the destination node to the starting node, following the nodes with the smallest calculated distance.

Illustrating application of the algorithm, first consider finding the route from node 502 to node 508 without considering the network condition along each route segment. The current node starts at node 502, node 504 is tentatively marked as having distance 7, and node 506 is tentatively marked as having distance 10. Node 502 is marked visited, and the current node becomes node 504. The tentative distance from node 504 to node 506 is 7+9=16, which is larger than the previously calculated distance of 10 and thus disregarded. The tentative distance to node 508 is marked as 21. Node 504 is marked as visited and the current node becomes node 506. The tentative distance to node 508 is marked as 12, replacing the previously calculated tentative distance. Node 506 is marked as visited and the current node becomes node 508. Because the current node is the destination node, the algorithm is completed. In that illustrative example, the shortest path without considering network condition is from node 502 through node 506 to node 508, and has distance 12.

Now consider finding the route from node 502 to node 508 while considering network condition. In the illustrative example, the route segments from node 502 to node 506 and from node 506 to node 508 have poor network condition. Thus, the road costs for those route segments have been increased from 10 to 16 and from 2 to 6, respectively. Applying the algorithm, the current node starts at node 502, node 504 is tentatively marked as having distance 7, and node 506 is tentatively marked as having distance 16. Node 502 is marked visited, and the current node becomes node 504. The tentative distance from node 504 to node 506 is 7+9=16, which is the same as the previously calculated distance of 16 and thus may be disregarded. The tentative distance to node 508 is marked as 21. Node 504 is marked as visited and the current node becomes node 506. The tentative distance to node 508 is 16+6=22, which is larger than the previously calculated distance of 21 and is thus disregarded. Node 506 is marked as visited and the current node becomes node 508. Because the current node is the destination node, the algorithm is completed. In that illustrative example, the shortest path while considering network condition is from node 502 through node 504 to node 508, and has distance 21. Thus, in that example, the route segments that have poor network conditions—the segments from node 502 to node 506 and from node 506 to node 508—are avoided.

Referring back to FIG. 4, after determining the optimal route, in block 426 the mobile computing device 102 and/or the crowdsourcing server 104 presents the route to the user. In some embodiments in block 428 the mobile computing device 102 may output the route to a user interface. The mobile computing device 102 may use any user interface mode, for example displaying a graphical map using the display 132 or outputting audible directions using the audio device 134. Additionally or alternatively, in some embodiments in block 430 the crowdsourcing server 104 may transmit the optimal route to the mobile computing device 102. The crowdsourcing server 104 may transmit the route in any format useable by the mobile computing device 102. For example, in some embodiments the crowdsourcing server 104 may transmit formatted hypertext and/or images describing the optimal route. Additionally or alternatively, the crowdsourcing server 104 may transmit data describing the optimal route that is parsed, rendered, and/or otherwise processed by the mobile computing device 102 for presentation to the user. After presenting the optimal route to the user, the method 400 loops back to block 402 to service another request for a route.

Figure 6:
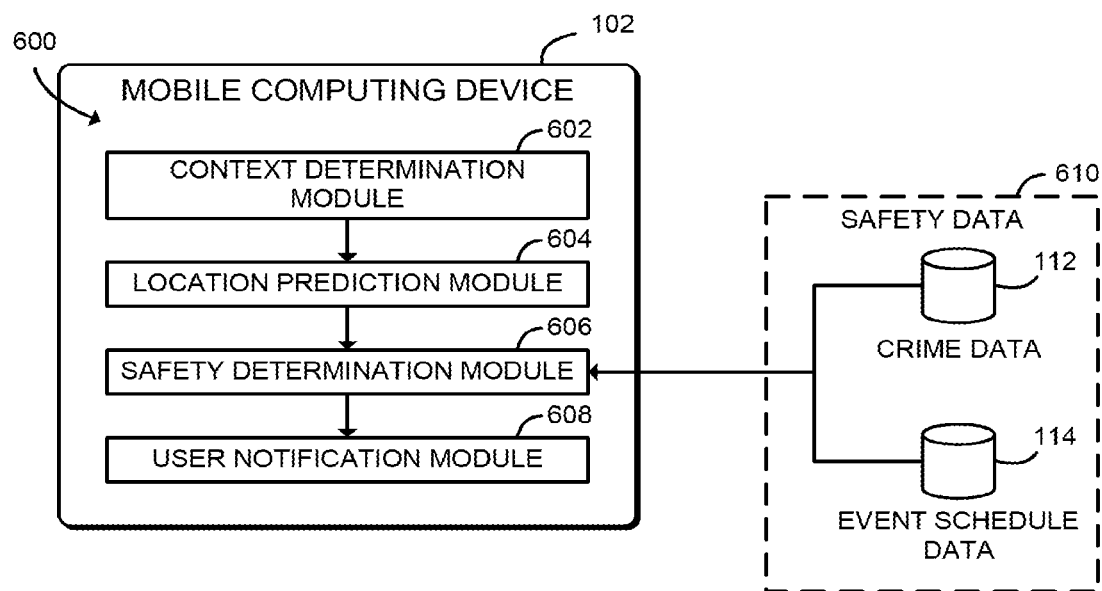
FIG. 6 is a simplified block diagram of at least one embodiment of an environment that may be established by the system of FIG. 1.

Referring now to FIG. 6, in some embodiments, the mobile computing device 102 may, additionally or alternatively, establish an environment 600 during operation. The illustrative environment 600 includes a context determination module 602, a location prediction module 604, a safety determination module 606, and a user notification module 608. The various modules of the environment 600 may be embodied as hardware, firmware, software, or a combination thereof.

The context determination module 602 is configured to determine the context of the mobile computing device 102. The device context may include any combination of information relating to the current location, current condition, or current usage of the mobile computing device 102. For example, the device context may include the current location, direction, and speed of the mobile computing device 102, the current time of day, the user's planned route, the user's current mode of transportation, properties of the user's current vehicle, or any combination of that data.

The location prediction module 604 is configured to predict a future location of the mobile computing device 102 based on the current device context. The location may be predicted based on the current location and movement of the mobile computing device 102, based on a planned route of the mobile computing device 102, or based on any other context data related to a future location of the mobile computing device 102. The predicted location is evaluated for safety by the safety determination module 606.

The safety determination module 606 is configured to determine a safety level for the predicted location based on the device context. The safety determination module 606 is also configured to compare the determined safety level to a threshold safety level to determine the relative safety of the predicted location. The safety level may be determined based on predefined safety data 610, for example the crime data 112 and/or the event schedule data 114. As described further below, the crime data 112 and the event schedule data 114 may be used to determine a safety level generally associated with the predicted location, or may be used to determine a safety level particular to the device context. For example, the crime data 112 may include data specifying crime rates at different times of day, and the safety determination module 606 may determine the safety level based on the current time of day.

The user notification module 608 is configured to notify the user when the predicted location is relatively unsafe. The user notification module 608 may notify the user when the safety level has a predetermined relationship to a threshold safety level, for example, when the safety level falls below the threshold. The user notification module 608 may notify the user using any available user interaction modality, such as graphical display, audible output, or tactile feedback.

Figure 7:
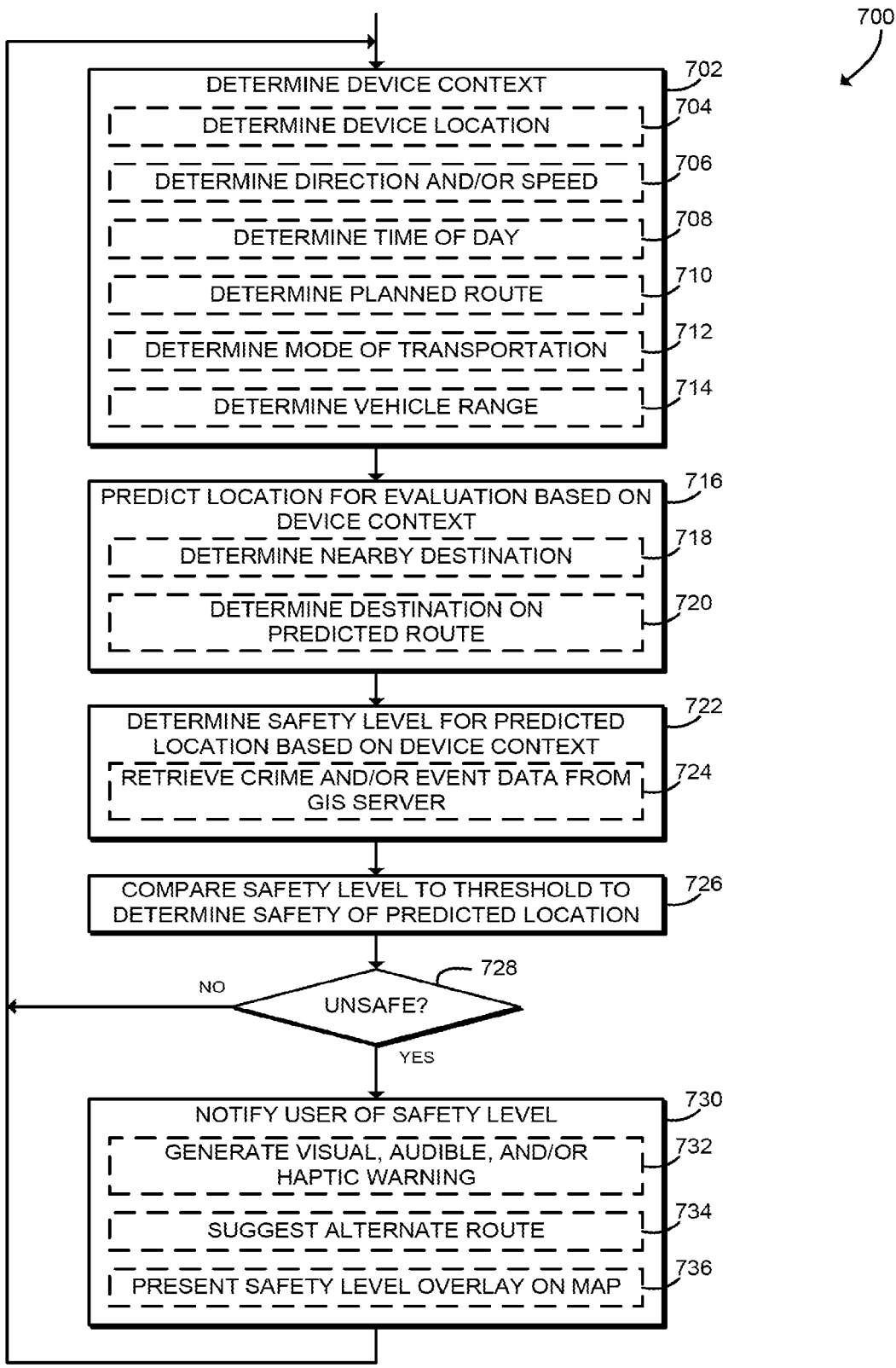
FIG. 7 is a simplified flow diagram of at least one embodiment of a method for notifying the user of an unsafe location that may be executed by the mobile computing device of FIGS. 1 and 6.

Referring now to FIG. 7, in use the mobile computing device 102 may execute a method 700 for notifying the user of an unsafe location. The method 700 begins in block 702, in which the mobile computing device 102 determines the context of the mobile computing device 102. The device context may include any information relating to the current location, current condition, or current usage of the mobile computing device 102. For example, in some embodiments in block 704 the mobile computing device 102 may determine the current location of the mobile computing device 102. The mobile computing device 102 may use the location circuitry 130 to make that determination. In some embodiments, in block 706 the mobile computing device 102 may determine the direction and/or speed of the mobile computing device 102. Direction and/or speed data may be determined based on location data determined using the location circuitry 130. Additionally or alternatively, direction and/or speed data may be received from a vehicle coupled to the mobile computing device 102. In some embodiments, in block 708 the mobile computing device 102 may determine the local time of day associated with the mobile computing device 102.

In some embodiments, in block 710 the mobile computing device 102 may determine a planned route. For example, the mobile computing device 102 may determine the planned route based on input received from the user, for example in a mapping application. In some embodiments, the mobile computing device 102 may infer part or all of the route, for example determining a route from the current location to a known destination. Additionally, in some embodiments, in block 712 the mobile computing device 102 may determine a mode of transportation (e.g., walking, driving, public transit, etc.) associated with the mobile computing device 102. The determination of the mode of transit may be based on location or movement data determined using the location circuitry 130. In some embodiments, in block 714 the mobile computing device 102 may determine the current range of a vehicle associated with the mobile computing device 102. For example, the mobile computing device 102 may communicate with the vehicle to reference available fuel and driving conditions that may be used to determine the distance that the vehicle is capable of traveling.

In block 716, the mobile computing device 102 predicts a location for evaluation based on the device context. The predicted location is a location that the mobile computing device 102—and thereby the user—is likely to visit in the future. By using a predicted future location for evaluation, the mobile computing device 102 is capable of alerting the user to potential unsafe conditions before the user enters or arrives at the predicted location as discussed below. In some embodiments, in block 718 the mobile computing device 102 may determine a nearby destination. For example, given the current device location, direction, and speed, the mobile computing device 102 may predict a location adjacent to the current location in the current direction of travel. The distance to the predicted location may depend on, for example, speed or mode of travel. For example, when walking the predicted location may be the next block; when driving the predicted location may be the next neighborhood or arterial street. In some embodiments, in block 720 the mobile computing device 102 may determine a destination on the predicted route. The predicted location may be on a portion of the predicted route that is not immediately adjacent to the current location of the mobile computing device 102.

In block 722, the mobile computing device 102 determines a safety level for the predicted location based on the device context. The safety level may be embodied as any quantifiable value associated with the likelihood of crime at the predicted location. For example, the safety level may be based on the crime data 112. The crime data 112 may include any data relating to the incidence of crime for a particular geographical location, such as the number of reported crimes, the rate of crimes per time period, the rate of crimes per population, the likelihood of crime in a particular geographical area, or the likelihood of crime at a particular time of day. The crime data 112 may be aggregated for all crimes, or may include data for subsets of crimes (e.g. violent crime, property crime, etc.). Additionally or alternatively, the safety level may be based on the event schedule data 114. The mobile computing device 102 may determine whether any mass crowd events are scheduled for the predicted location and device context (e.g. time of day). Mass crowd events may include sporting events, festivals, public protests, and other events likely to draw large amounts of people into a concentrated geographical area. The existence of a mass crowd event may cause the mobile computing device 102 to determine a lower safety level. In addition to determining the safety level based on predefined safety data such as the crime data 112 and/or the event schedule 114, the mobile computing device 102 also determines the safety level based on current device context. For example, for a particular location, the determined safety level may be lower at night than for the same location in the daytime. In some embodiments, in block 724 the mobile computing device 102 may retrieve the crime data 112 and/or the event schedule data 114 from the GIS server 106.

In block 726, the mobile computing device 102 compares the determined safety level to a threshold safety level to determine the safety of the predicted location. In some embodiments, the comparison may be binary, resulting in a determination that the predication location is either safe or unsafe. In some embodiments, the comparison may determine a continuum of relative safety levels from completely safe to completely unsafe. In block 728, the mobile computing device 102 determines whether the predicted location is unsafe. If the predicted location is safe (or completely safe), the method 700 loops back to block 702 to continue monitoring the device context. If the predicted location is unsafe (or not completely safe), the method 700 advances to block 730.

In block 730, the mobile computing device 102 notifies the user of the safety level. The mobile computing device 102 may use any available user interaction mode to notify the user. In some embodiments, in block 732 the mobile computing device 102 may generate a visual, audible, or haptic warning for the user. The warning may be progressive in nature; that is, the warning may increase in amplitude and/or urgency as the safety level of the predicted location decreases. It should be understood that the warning may continue to be displayed or otherwise be maintained while the mobile computing device 102 remains in an unsafe location. In some embodiments, the warning may be generated in a manner that is not likely to also alert or disturb nearby persons. For example, the mobile computing device 102 may activate the haptic device 136 to notify the user when about to enter a dangerous area. The mobile computing device 102 may generate a haptic signal (e.g., a vibration pattern) distinct from other notifications produced by the mobile computing device 102, allowing the user to be aware of potential danger without needing to visually reference the mobile computing device 102. As another example, the mobile computing device 102 may generate a visual indicator such as an icon or warning label on the display 132 to notify the user. For example, when the mobile computing device 102 is embodied as a wearable computing device such as smart eyeglasses, the visual indicator may be displayed on a heads-up display 132 positioned to be visible only to the user of the mobile computing device 102.

In some embodiments, in block 734 the mobile computing device 102 may suggest an alternate route to the user. The alternate route may be an alternate direction, route, or destination with a higher safety level than the predicted location. For example, again considering a wearable computing device with a heads-up display, the mobile computing device 102 may simply display an arrow or other visual indicator directing the user toward relative safety. As another example, the mobile computing device 102 may generate a haptic signal directing the user toward relative safety. For example, the mobile computing device 102 may generate vibration on the user's side pointed toward an unsafe predicted location to indicate that the user should not approach that direction. As another example, the mobile computing device 102 may generate an alternative route and/or alternative locations along a route. For example, when traveling by car, the mobile computing device 102 may determine that a particular location (e.g., fuel station, rest area, etc.) along the planned route is not safe and suggest an alternate location (e.g., an alternate fuel station in a safer location). Of course, the mobile computing device 102 may consider device context such as vehicle range when determining the alternate route.

In some embodiments, in block 736 the mobile computing device 102 may present a safety level overlay on a map. Presentation of the safety level information may allow the user to determine an alternate route or otherwise evaluate safety. For example, the mobile computing device 102 may color-code or otherwise indicate the safety level for points along the planned route. Presentation of the safety level on the map may be appropriate for more-capable embodiments of the mobile computing device 102 such as smartphones or in-vehicle infotainment devices. After notifying the user of the safety level, the method 700 loops back to block 702 to continue monitoring the device context.

EXAMPLES

Illustrative examples of the technologies disclosed herein are provided below. An embodiment of the technologies may include any one or more, and any combination of, the examples described below.

Example 1 includes a mobile computing device for generating directional routing instructions, the mobile computing device comprising a network monitoring module to determine network condition information associated with a route segment of a plurality of route segments defining one or more routes between a starting location and a destination location; and store the network condition information; and a route determination module to determine a route from the starting location to the destination location as a function of the network condition information.

Example 2 includes the subject matter of Example 1, and wherein the network condition information comprises a network type associated with the route segment.

Example 3 includes the subject matter of any of Examples 1 and 2, and wherein the network condition information comprises a network signal strength associated with the route segment.

Example 4 includes the subject matter of any of Examples 1-3, and wherein to determine the network condition information comprises to determine a current location of the mobile computing device; determine network condition information associated with the current location of the mobile computing device; and associate the network condition information with the route segment of the plurality of route segments associated with the current location.

Example 5 includes the subject matter of any of Examples 1-4, and wherein to determine the network condition information comprises to determine a plurality of locations of the mobile computing device associated with the route segment; determine an average network condition information for the plurality of locations; and associate the average network condition information with the route segment.

Example 6 includes the subject matter of any of Examples 1-5, and wherein to determine the network condition information comprises to receive network condition information associated with the route segment from a crowdsourcing server.

Example 7 includes the subject matter of any of Examples 1-6, and wherein to determine the route comprises to determine road cost information associated with the plurality of route segments; adjust the road cost information associated with the route segment based on the network condition information associated with the route segment; and determine the route as a function of the adjusted road cost information associated with the plurality of route segments.

Example 8 includes the subject matter of any of Examples 1-7, and wherein to determine the route as a function of the adjusted road cost information comprises to perform a Dijkstra shortest-path graph search algorithm based on the adjusted road cost information.

Example 9 includes the subject matter of any of Examples 1-8, and wherein to determine the route comprises to determine a provisional route from the starting location to the destination location, the provisional route including the route segment; and alter the provisional route based on the network condition information associated with the route segment.

Example 10 includes the subject matter of any of Examples 1-9, and wherein to alter the provisional route comprises to determine whether the network condition information associated with the route segment has a predefined relationship to a reference network condition; and reroute the route to avoid the route segment in response to the network condition information having the predefined relationship to the reference network condition.

Example 11 includes a crowdsourcing server for generating directional routing instructions, the crowdsourcing server comprising a network data management module to receive network condition information from a first mobile computing device, the network condition information associated with a route segment of a plurality of route segments defining one or more routes between a starting location and a destination location; and a route determination module to (i) receive a request for a route from the starting location to the destination location from a second mobile computing device and (ii) determine a route from the starting location to the destination location as a function of the network condition information.

Example 12 includes the subject matter of Example 11, and wherein the route determination module is further to transmit the route to the second mobile computing device.

Example 13 includes the subject matter of any of Examples 11 and 12, and wherein the network condition information comprises a network type associated with the location.

Example 14 includes the subject matter of any of Examples 11-13, and wherein the network condition information comprises a network signal strength associated with the location.

Example 15 includes the subject matter of any of Examples 11-14, and wherein to determine the route comprises to determine road cost information associated with the plurality of route segments; adjust the road cost information associated with the route segment based on the network condition information associated with the route segment; and determine the route as a function of the adjusted road cost information associated with the plurality of route segments.

Example 16 includes the subject matter of any of Examples 11-15, and wherein to determine the route as a function of the adjusted road cost information comprises to perform a Dijkstra shortest-path graph search algorithm based on the adjusted road cost information.

Example 17 includes the subject matter of any of Examples 11-16, and wherein to determine the route comprises to determine a provisional route from the starting location to the destination location, the provisional route including the route segment; and alter the provisional route based on the network condition information associated with the route segment.

Example 18 includes the subject matter of any of Examples 11-17, and wherein to alter the provisional route comprises to determine whether the network condition information associated with the route segment has a predefined relationship to a reference network condition; and reroute the route to avoid the route segment in response to the network condition information having the predefined relationship to the reference network condition.

Example 19 includes the subject matter of any of Examples 11-18, and wherein the first mobile computing device is different from the second mobile computing device.

Example 20 includes the subject matter of any of Examples 11-19, and wherein the first mobile computing device is the same device as the second mobile computing device.

Example 21 includes a mobile computing device for user safety notification, the mobile computing device comprising a context determination module to determine a device context of the mobile computing device; a location prediction module to predict a location for evaluation based on the device context; a safety determination module to: (i) determine a safety level for the predicted location based on predetermined safety data and the device context and (ii) compare the safety level to a threshold safety level; and a user notification module to notify a user of the mobile computing device of the safety level in response to a determination that the safety level has a predefined relationship to the threshold safety level.

Example 22 includes the subject matter of Example 21, and wherein to determine the safety level comprises to determine a predicted crime level associated with the determined location based on predetermined crime data.

Example 23 includes the subject matter of any of Examples 21 and 22, and wherein to determine the predicted crime level comprises to receive the predetermined crime data from a geographic information system server.

Example 24 includes the subject matter of any of Examples 21-23, and wherein to determine the safety level comprises to determine a predicted mass crowd event associated with the determined location.

Example 25 includes the subject matter of any of Examples 21-24, and wherein to determine the predicted mass crowd event comprises to receive predetermined event schedule data from a geographic information system server.

Example 26 includes the subject matter of any of Examples 21-25, and wherein to notify the user of the safety level comprises to generate a warning signal.

Example 27 includes the subject matter of any of Examples 21-26, and wherein the warning signal comprises a visible, audible, or haptic warning.

Example 28 includes the subject matter of any of Examples 21-27, and wherein the user notification module is further to maintain the warning signal while the safety level has the predefined relationship to the threshold safety level.

Example 29 includes the subject matter of any of Examples 21-28, and wherein to notify the user of the safety level further comprises to present a suggested alternate route to the user.

Example 30 includes the subject matter of any of Examples 21-29, and wherein to present the suggested alternate route comprises to display a visual directional indicator or to generate a haptic directional indicator.

Example 31 includes the subject matter of any of Examples 21-30, and wherein to present the suggested alternate route comprises to present a suggested alternate location on a predicted route of the mobile computing device.

Example 32 includes the subject matter of any of Examples 21-31, and wherein to notify the user of the safety level comprises to overlay the safety level on a map of a predicted route of the mobile computing device.

Example 33 includes the subject matter of any of Examples 21-32, and wherein the device context comprises a location of the mobile computing device; a direction and speed of the mobile computing device; a time of day; a planned route of the mobile computing device; a mode of transportation of the mobile computing device; or a vehicle range associated with the mobile computing device.

Example 34 includes the subject matter of any of Examples 21-33, and wherein to determine the device context comprises to receive a requested destination from the user for the planned route of the mobile computing device.

Example 35 includes the subject matter of any of Examples 21-34, and wherein to predict the location for evaluation comprises to determine a current location of the mobile computing device;

Example 36 includes the subject matter of any of Examples 21-35, and wherein to predict the location for evaluation comprises to determine a nearby destination of the mobile computing device;

Example 37 includes the subject matter of any of Examples 21-36, and wherein to predict the location for evaluation comprises to determine a destination on a predicted route of the mobile computing device.

Example 38 includes a method for generating directional routing instructions, the method comprising determining, by a mobile computing device, network condition information associated with a route segment of a plurality of route segments defining one or more routes between a starting location and a destination location; storing, by the mobile computing device, the network condition information; and determining, by the mobile computing device, a route from the starting location to the destination location as a function of the network condition information.

Example 39 includes the subject matter of Example 38, and wherein determining the network condition information comprises determining a network type associated with the route segment.

Example 40 includes the subject matter of any of Examples 38 and 39, and wherein determining the network condition information comprises determining a network signal strength associated with the route segment.

Example 41 includes the subject matter of any of Examples 38-40, and wherein determining the network condition information comprises determining a current location of the mobile computing device; determining network condition information associated with the current location of the mobile computing device; and associating the network condition information with the route segment of the plurality of route segments associated with the current location.

Example 42 includes the subject matter of any of Examples 38-41, and wherein determining the network condition information comprises determining a plurality of locations of the mobile computing device associated with the route segment; determining an average network condition information for the plurality of locations; and associating the average network condition information with the route segment.

Example 43 includes the subject matter of any of Examples 38-42, and wherein determining the network condition information comprises receiving network condition information associated with the route segment from a crowdsourcing server.

Example 44 includes the subject matter of any of Examples 38-43, and wherein determining the route comprises determining road cost information associated with the plurality of route segments; adjusting the road cost information associated with the route segment based on the network condition information associated with the route segment; and determining the route as a function of the adjusted road cost information associated with the plurality of route segments.

Example 45 includes the subject matter of any of Examples 38-44, and wherein determining the route as a function of the adjusted road cost information comprises performing a Dijkstra shortest-path graph search algorithm based on the adjusted road cost information.

Example 46 includes the subject matter of any of Examples 38-45, and wherein determining the route comprises determining a provisional route from the starting location to the destination location, the provisional route including the route segment; and altering the provisional route based on the network condition information associated with the route segment.

Example 47 includes the subject matter of any of Examples 38-46, and wherein altering the provisional route comprises determining whether the network condition information associated with the route segment has a predefined relationship to a reference network condition; and rerouting the route to avoid the route segment in response to the network condition information having the predefined relationship to the reference network condition.

Example 48 includes a method for generating directional routing instructions, the method comprising receiving, by a crowdsourcing server, network condition information from a first mobile computing device, the network condition information associated with a route segment of a plurality of route segments defining one or more routes between a starting location and a destination location; receiving, by the crowdsourcing server, a request for a route from the starting location to the destination location from a second mobile computing device; and determining, by the crowdsourcing server, a route from the starting location to the destination location as a function of the network condition information.

Example 49 includes the subject matter of Example 48, and further including transmitting, by the crowdsourcing server, the route to the second mobile computing device.

Example 50 includes the subject matter of any of Examples 48 and 49, and wherein receiving the network condition information comprises receiving a network type associated with the location.

Example 51 includes the subject matter of any of Examples 48-50, and wherein receiving the network condition information comprises receiving a network signal strength associated with the location.

Example 52 includes the subject matter of any of Examples 48-51, and wherein determining the route comprises determining road cost information associated with the plurality of route segments; adjusting the road cost information associated with the route segment based on the network condition information associated with the route segment; and determining the route as a function of the adjusted road cost information associated with the plurality of route segments.

Example 53 includes the subject matter of any of Examples 48-52, and wherein determining the route as a function of the adjusted road cost information comprises performing a Dijkstra shortest-path graph search algorithm based on the adjusted road cost information.

Example 54 includes the subject matter of any of Examples 48-53, and wherein determining the route comprises determining a provisional route from the starting location to the destination location, the provisional route including the route segment; and altering the provisional route based on the network condition information associated with the route segment.

Example 55 includes the subject matter of any of Examples 48-54, and wherein altering the provisional route comprises determining whether the network condition information associated with the route segment has a predefined relationship to a reference network condition; and rerouting the route to avoid the route segment in response to the network condition information having the predefined relationship to the reference network condition.

Example 56 includes the subject matter of any of Examples 48-55, and wherein the first mobile computing device is different from the second mobile computing device.

Example 57 includes the subject matter of any of Examples 48-56, and wherein the first mobile computing device is the same device as the second mobile computing device.

Example 58 includes a method for user safety notification, the method comprising determining, by a mobile computing device, a device context of the mobile computing device; predicting, by the mobile computing device, a location for evaluation based on the device context; determining, by the mobile computing device, a safety level for the predicted location based on predetermined safety data and the device context; comparing, by the mobile computing device, the safety level to a threshold safety level; and notifying, by the mobile computing device, a user of the mobile computing device of the safety level in response to determining that the safety level has a predefined relationship to the threshold safety level.

Example 59 includes the subject matter of Example 58, and wherein determining the safety level comprises determining a predicted crime level associated with the determined location based on predetermined crime data.

Example 60 includes the subject matter of any of Examples 58 and 59, and wherein determining the predicted crime level comprises receiving the predetermined crime data from a geographic information system server.

Example 61 includes the subject matter of any of Examples 58-60, and wherein determining the safety level comprises determining a predicted mass crowd event associated with the determined location.

Example 62 includes the subject matter of any of Examples 58-61, and wherein determining the predicted mass crowd event comprises receiving predetermined event schedule data from a geographic information system server.

Example 63 includes the subject matter of any of Examples 58-62, and wherein notifying the user of the safety level comprises generating a warning signal.

Example 64 includes the subject matter of any of Examples 58-63, and wherein generating the warning signal comprises generating a visible, audible, or haptic warning.

Example 65 includes the subject matter of any of Examples 58-64, and further including maintaining, by the mobile computing device, the warning signal while the safety level has the predefined relationship to the threshold safety level.

Example 66 includes the subject matter of any of Examples 58-65, and wherein notifying the user of the safety level further comprises presenting a suggested alternate route to the user.

Example 67 includes the subject matter of any of Examples 58-66, and wherein presenting the suggested alternate route comprises displaying a visual directional indicator or generating a haptic directional indicator.

Example 68 includes the subject matter of any of Examples 58-67, and wherein presenting the suggested alternate route comprises presenting a suggested alternate location on a predicted route of the mobile computing device.

Example 69 includes the subject matter of any of Examples 58-68, and wherein notifying the user of the safety level comprises overlaying the safety level on a map of a predicted route of the mobile computing device.

Example 70 includes the subject matter of any of Examples 58-69, and wherein determining the device context comprises determining a location of the mobile computing device; determining a direction and speed of the mobile computing device; determining a time of day; determining a planned route of the mobile computing device; determining a mode of transportation of the mobile computing device; or determining a vehicle range associated with the mobile computing device.

Example 71 includes the subject matter of any of Examples 58-70, and wherein determining the planned route comprises receiving a requested destination from the user.

Example 72 includes the subject matter of any of Examples 58-71, wherein predicting the location for evaluation comprises determining a current location of the mobile computing device;

Example 73 includes the subject matter of any of Examples 58-72, wherein predicting the location for evaluation comprises determining a nearby destination of the mobile computing device;

Example 74 includes the subject matter of any of Examples 58-73, wherein predicting the location for evaluation comprises determining a destination on a predicted route of the mobile computing device.

Example 75 includes a computing device comprising a processor; and a memory having stored therein a plurality of instructions that when executed by the processor cause the computing device to perform the method of any of Examples 38-74.

Example 76 includes one or more machine readable storage media comprising a plurality of instructions stored thereon that in response to being executed result in a computing device performing the method of any of Examples 38-74.

Example 77 includes a computing device comprising means for performing the method of any of Examples 38-74.

The invention claimed is:

1. A mobile computing device for user safety notification, the mobile computing device comprising:
one or more processors; and
a storage having stored therein a plurality of instructions that, when executed by the one or more processors, cause the mobile computing device to:
determine a device context of the mobile computing device;
predict a location for evaluation based on the device context;
determine a safety level for the predicted location based on predetermined safety data and the device context;
compare the safety level to a threshold safety level; and
notify a user of the mobile computing device of the safety level in response to a determination that the safety level has a predefined relationship to the threshold safety level.

2. The mobile computing device of claim 1, wherein to determine the safety level comprises to determine a predicted crime level associated with the determined location based on predetermined crime data.

3. The mobile computing device of claim 1, wherein to determine the safety level comprises to determine a predicted mass crowd event associated with the determined location.

4. The mobile computing device of claim 1, wherein to notify the user of the safety level comprises to generate a warning signal.

5. The mobile computing device of claim 1, wherein to notify the user of the safety level further comprises to present a suggested alternate route to the user.

6. The mobile computing device of claim 5, wherein to present the suggested alternate route comprises to display a visual directional indicator or to generate a haptic directional indicator.

7. The mobile computing device of claim 5, wherein to present the suggested alternate route comprises to present a suggested alternate location on a predicted route of the mobile computing device.

8. The mobile computing device of claim 1, wherein to predict the location for evaluation comprises to determine a current location of the mobile computing device.

9. The mobile computing device of claim 1, wherein to predict the location for evaluation comprises to determine a nearby destination of the mobile computing device.

10. The mobile computing device of claim 1, wherein to predict the location for evaluation comprises to determine a destination on a predicted route of the mobile computing device.

11. One or more non-transitory, computer-readable storage media comprising a plurality of instructions that in response to being executed cause a mobile computing device to:
determine a device context of the mobile computing device;
predict a location for evaluation based on the device context;
determine a safety level for the predicted location based on predetermined safety data and the device context;
compare the safety level to a threshold safety level; and
notify a user of the mobile computing device of the safety level in response to determining that the safety level has a predefined relationship to the threshold safety level.

12. The one or more non-transitory computer-readable storage media of claim 11, wherein to determine the safety level comprises to determine a predicted crime level associated with the determined location based on predetermined crime data.

13. The one or more non-transitory, computer-readable storage media of claim 11, wherein to determine the safety level comprises to determine a predicted mass crowd event associated with the determined location.

14. The one or more non-transitory, computer-readable storage media of claim 11, wherein to notify the user of the safety level comprises to generate a warning signal.

15. The one or more non-transitory, computer-readable storage media of claim 11, wherein to notify the user of the safety level further comprises to present a suggested alternate route to the user.

16. The one or more non-transitory, computer-readable storage media of claim 11, wherein to predict the location for evaluation comprises to determine a current location of the mobile computing device.

17. The one or more non-transitory, computer-readable storage media of claim 11, wherein to predict the location for evaluation comprises to determine a nearby destination of the mobile computing device.

18. The one or more non-transitory, computer-readable storage media of claim 11, wherein to predict the location for evaluation comprises to determine a destination on a predicted route of the mobile computing device.

19. A method for user safety notification, the method comprising:
   determining, by a mobile computing device, a device context of the mobile computing device;
   predicting, by the mobile computing device, a location for evaluation based on the device context;
   determining, by the mobile computing device, a safety level for the predicted location based on predetermined safety data and the device context;
   comparing, by the mobile computing device, the safety level to a threshold safety level; and
   notifying, by the mobile computing device, a user of the mobile computing device of the safety level in response to determining that the safety level has a predefined relationship to the threshold safety level.

20. The method of claim 19, wherein determining the safety level comprises determining a predicted crime level associated with the determined location based on predetermined crime data.

21. The method of claim 19, wherein determining the safety level comprises determining a predicted mass crowd event associated with the determined location.

22. The method of claim 19, wherein notifying the user of the safety level comprises generating a warning signal.

23. The method of claim 19, wherein notifying the user of the safety level further comprises presenting a suggested alternate route to the user.

24. The method of claim 19, wherein predicting the location for evaluation comprises determining a nearby destination of the mobile computing device.

25. The method of claim 19, wherein predicting the location for evaluation comprises determining a destination on a predicted route of the mobile computing device.

* * * * *